United States Patent [19]
Maeda

[11] 3,760,408
[45] Sept. 18, 1973

[54] INDUCTION TYPE TELEMETERING SYSTEM
[75] Inventor: Yoshio Maeda, Amagasaki, Japan
[73] Assignee: Mitsubishi Denki Kabushiki Kaisha, Tokyo, Japan
[22] Filed: Mar. 27, 1972
[21] Appl. No.: 238,558

[30] Foreign Application Priority Data
Mar. 31, 1971 Japan................ 46/23198

[52] U.S. Cl.................. 340/347 P, 235/92 EA
[51] Int. Cl............................... G08c 9/04
[58] Field of Search............... 340/347 DD, 347 P, 340/190

[56] References Cited
UNITED STATES PATENTS
| | | | |
|---|---|---|---|
| 3,491,244 | 1/1970 | Stewart | 340/347 P |
| 3,685,041 | 8/1972 | Kondiv | 340/347 P |
| 3,206,738 | 9/1965 | Wayman | 340/347 P |
| 3,067,414 | 12/1962 | Kelly | 340/347 DD |

Primary Examiner—Maynard R. Wilbur
Assistant Examiner—Jeremiah Glassman
Attorney—E. F. Wenderoth et al.

[57] ABSTRACT

A digit wheel bearing 10 decimal digits is provided on the magnetic disc-shaped portion thereof with four coupling openings radially aligned with selected four of the digits. When the wheel rotates, the openings are stepwise moved between five pairs of driving and output windings disposed in opposite relationship at equal angular intervals on both sides of the disc-shaped portion respectively, with the driving windings continuously energized with an alternating current. At each angular position of the wheel selected two of the openings are always positioned between selected two pairs of opposite windings permitting their electromagnetic coupling. Thus the two output windings produce respective voltages indicating a corresponding coded digit in the form of a two out of five code.

3 Claims, 6 Drawing Figures

PATENTED SEP 18 1973 3,760,408
FIG. 1a  FIG. 1b  FIG. 2a  FIG. 2b
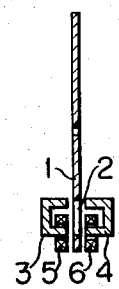
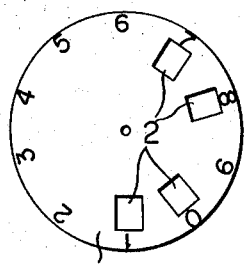
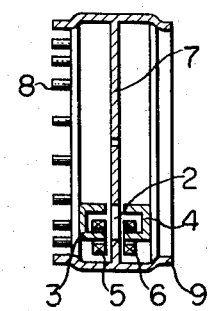
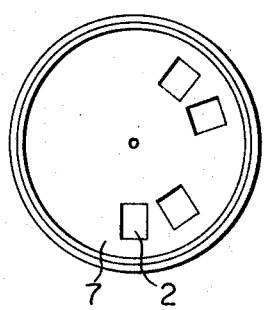
FIG. 2c
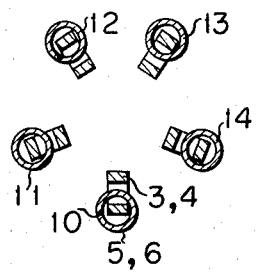
FIG. 3
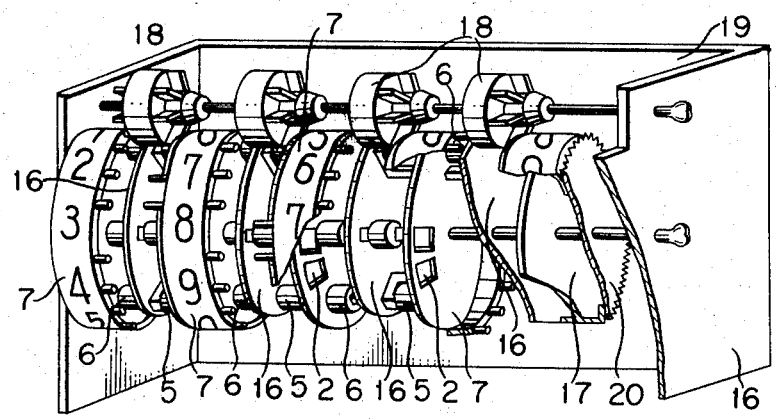

INDUCTION TYPE TELEMETERING SYSTEM

BACKGROUND OF THE INVENTION

This invention relates to an induction type telemetering system and more particularly to a contact-less type displayed measurement translator device for use in such a system including a digit wheel and electromagnetic coupling means operatively associated therewith to translate digits successively viewed on the digit wheel into corresponding electrical signals in the form of codes.

In the field of the automatic gauge examination, for example, utilizing the telemetering system, there have been already known various types of translators for converting measured quantities to signals which can be transmitted, e.g. electrical signals or the like. The known translators have been of the contact type which have the disadvantage of low reliability over long periods of time. On the other hand, those measuring instruments operatively associated with the translators, such as watt-hour meters, are high in long time reliability. This conflict between the translator for automatic gauge examination and watt-hour meter has made it difficult to incorporate the two into a unitary structure. For this reason, the watt-hour meter has included its display unit overlapping the translator portion of the associated terminal unit for automatic gauge examination. In other words, the display unit has overlapped a translation mechanism in the terminal unit, whereby overall economy has not been impaired.

This results from the adoption of the contact type of translation mechanisms. Alternatively, even if the translation mechanism would be of the contact-less type, the resulting translator has been difficult to be kept reliable without maintenance for long periods of time, and also is complicated in construction.

SUMMARY OF THE INVENTION

Accordingly it is an object of the invention to provide a new and improved displayed measurement translator device for a digital wheel simple in construction and high in both overall reliability and economy through the utilization of the principles of mutual electromagnetic induction.

The invention accomplishes this object by the provision of a displayed measurement translator device for providing a coded measured value, comprising, in combination, a stepwise rotatable digit wheel including an encoding portion in the form of a sheet having a plurality of coupling openings disposed in a predetermined pattern thereon, a plurality of driving windings disposed in a predetermined pattern on one side of the encoding portion and continuously energized with an alternating current, and a plurality of output windings on the other side of the encoding portion opposing the respective driving windings through the encoding portion, each of the coupling openings being selectively put between the pairs of opposite windings during the stepwise rotational movement of the digit wheel to permit the electromagnetic coupling thereof through that coupling opening put therebetween to induce a voltage across the associated output winding, the voltage induced across at least one of the output windings indicating the coded measured value.

BRIEF DESCRIPTION OF THE DRAWING

The invention will become more readily apparent from the following detailed description taken in conjunction with the accompanying drawing in which:

FIG. 1a is a sectional view of an encoding disc useful in explaining the principles of the invention;

FIG. 1b is a plan view of the encoding disc shown in FIG. 1a with parts omitted;

FIG. 2a is a side elevational view, partly in section of an encoding digital wheel unit constructed in accordance with the principles of the invention;

FIG. 2b is a plan view of the digital wheel unit shown in FIG. 2a with parts omitted;

FIG. 2c is a plan view of the relative positions of the electromagnetic windings shown in FIG. 2a; and FIG. 3 is a fragmental perspective view, partly in section, of one form of the invention applied to a conventional watt-hour meter with parts broken away.

DESCRIPTION OF PREFERRED EMBODIMENT

The invention comprises a combination of an encoding digit wheel and electromagnetic coupling means to transform digits successively viewed on the digit wheel into corresponding electrical signals in the form of codes. Since the existing digit wheels bear in most cases the 10 decimal digits 0, 1, 2, . . . , 9, the invention will now be described in conjunction with the decimal numeration and particularly in terms of the transformation of decimal numbers into binary coded decimal numbers each expressed by a two out of five code. However, it is to be understood that the invention is not limited thereby or thereto and that it is equally applicable to the transformation of decimal numbers into any desired code type decimical numbers, for example, 4 × 4 code type deminal numbers. Also it is to be understood that the principles of the invention can be utilized to transform numbers having a radix of $n$ into corresponding coded numbers having the same radix.

Referring now to FIG. 1 of the drawing, there is illustrated an encoding rotatable disc that may be used with the invention. The encoding disc designated by the reference numeral 1 is formed of any suitable magnetic material and has ten decimal digits 0, 1, 2, . . . , 9 denoted at substantially equal angular intervals on the peripheral portion of one face thereof and a plurality of coupling openings 2 disposed in a predetermined pattern on a circle concentric with the circular peripheral edge of the disc. In FIG. 1b four coupling opening 2 are shown as being radially aligned with the decimal digits 0, 1, 7 and 8 for the purpose of transforming the decimal numbers into corresponding binary coded decimal numbers each expressed by a two out of five code.

As shown in FIG. 1a a pair of L-shaped magnetic cores 3 and 4 are disposed in opposite relationship on both sides of the encoding disc 1 respectively so that both legs of one of the "L's" oppose the corresponding legs of the other "L" and also can face the openings 2. Both magnetic cores 3 and 4 have respective windings 5 and 6 inductively disposed on one leg, in this case, the lower legs as viewed in FIG. 1a of the cores. The winding 5 forms a driving winding continuously energized with an alternating current while the winding 6 forms an output winding.

The encoding disc 1 is arranged to be stepwise rotated about its center. More specifically, the encoding disc 1 is responsive to an increment of the particular measured decimal value to step a one-tenth complete rotation thereof. During this stepping movement each of the coupling openings 2 can be positioned between the pair of opposite cores 3 and 4. At that time, the cores 3 and 4 are permitted to be electromagnetically coupled to each other through that opening 2 just positioned therebetween whereby voltage is induced across the output winding 6.

With the 2 out of 5 code used, five pairs of the driving and output windings 5 and 6 respectively can be disposed at substantially equal angular intervals on the same circle as the coupling openings 2. In this measure, selected two of the winding pairs 5 – 6 induce the respective voltages thereacross at each angular position of the disc 1 or for each decimal digit to provide a corresponding coded signal.

The pattern in which the openings 2 and winding pairs 5 – 6 are arranged depends upon the type of coded signals into which the decimal digits are transformed.

FIG. 2, wherein like reference numerals designate the components corresponding to those illustrated in FIG. 1, shows the encoding disc 1 as above described in conjunction with FIG. 1 incorporated into a rotatable digit wheel typically used in the existing watt-hour meters and the like. In FIG. 2, the reference numeral 7 designates an encoding rotatable digit wheel having an encoding disc as above described in conjunction with FIG. 1 and a display digit wheel formed into a unitary structure. As shown in FIG. 2a, the encoding digit wheel 7 includes a rim bearing 10 decimal digits (not shown) thereon in the conventional manner, a plurality of carry-out projections 8 disposed at predetermined angular intervals on one side, in this case, the lefthand side as viewed in FIG. 2a thereof, and a carry-out slide 9. In other respects forming the subject matter of the invention, the arrangement is identical to that shown in FIG. 1. The driving and output windings 5 and 6 respectively are shown in FIG. 2a as having leads connected thereto in order to energize the windings 5 with an alternating current as well as taking out the induced voltages from the windings 6.

FIG. 2b shows the encoding digit wheel as viewed in the axial direction thereof and also four coupling openings 2 arranged in the same manner as above described in conjunction with FIG. 1b.

FIG. 2c shows five combinations of L-shaped magnetic core 3 or 4 and winding 5 or 6 inductively disposed on the associated core. These combinations are designated by the reference numerals 10, 11, 12, 13 and 14 and disposed at substantially equal angular intervals so as to cooperate with the four coupling openings 2 on the encoding digit wheel 7 to provide electric signals in the form of 2 out of 5 binary codes representative of the corresponding decimal values.

By superposing FIG. 2b on FIG. 2c, it will be seen that among the five pairs of windings, the two windings of the winding pair 10 are electromagnetically coupled to each other through that coupling opening 2 positioned therebetween as do the two windings of the winding pair 13 resulting in the induction of two voltages indicating a predetermined decimal value in the form of a two out of five code.

FIG. 3, wherein like reference numerals designate the components identical or similar to those shown in FIG. 2, illustrates a contact-less type displayed measurement translator device constructed in accordance with the principles of the invention for the purpose of applying it to a watt-hour meter for example. The arrangement illustrated comprises a plurality, in this case four, of encoding digit wheels 7 as above described in conjunction with FIG. 2 alternating in axially aligned relationship with a plurality of supporting discs 16 for carrying the magnetic cores and the associated windings as above described in conjunction with FIG. 1. An auxiliary wheel 17 is disposed oppositely to the digit wheel 7 for the units place of the decimal number by having that supporting disc 16 for the units place digit wheel 7 interposed between that wheel 7 and wheel 17. The auxiliary wheel 17 includes means for driving the digit wheels 7. A plurality of carry-out wheels 18 are rotatably mounted on a common shaft, one of the wheels 18 being operatively coupled to each pair of adjacent digit wheels 7. The wheels 7 and 17 are rotatably mounted on another common shaft while the supporting discs 16 are fixed to the same shaft. Then both shafts are supported by end plates 16'(only one of which is illustrated) secured to a support plate 19. The auxiliary wheel 17 is operatively connected to a driving element 20 for driving the digit wheels 7. The driving element 20 may be a gear connected to a driving source such as an Arago's rotating disc (not shown) commonly used in watt-hour meters through a suitable gearing (not shown).

In operation, such an Arago's rotating disc or any other driving source forming the basic element of the particular measuring instrument is rotated to drive the driving element 20 and therefore the auxiliary wheel 17 through any suitable transmission means, for example, a speed reduction gearing. This causes the four digit wheels 7 to be rotated through the carry-out wheels 18 thereby to indicate the particular measured value. That is, that measured value is displayed by those decimal digits on the digit wheels as viewed through the window of the watt-hour meter (not shown).

Each of the supporting discs 16 carries five magnetic cores 3 with windings for the preceding digit wheel 7 on one surface, in this case, the lefthand side as viewed in FIG. 3 and also five magnetic cores 4 with windings for the succeeding digit wheel 7 on the other or righthand side in the pattern as above described in conjunction with FIG. 2, whereby five axial arrays of the magnetic core and winding combinations are formed. Therefore the displayed measured value is transformed into a corresponding electrical signal in the form of two out of five codes as will readily be understood from the description as above made for FIG. 2. The resulting coded signal provides the origin of information concerning a measured value such as a measured watt-hour value.

The invention has several advantages. For example, the present device is economical and has no mechanical loss because the display mechanism and read-out transforming mechanism include partly common portions and because electromagnetic induction is utilized.

While the invention has been illustrated and described in conjunction with a single preferred embodiment thereof it is to be understood that numerous changes and modifications may be resorted to without departing from the spirit and scope of the invention. For example, the encoding digit wheel may be of any desired shape other than the circular shape illustrated. It is essential that the digit wheel and the associated encoding portion should be operative as one member. If desired, the encoding portion may be disposed on the edge of the digit wheel rather than on the central portion thereof. Further the driving and output windings may be of the air core type. The invention may be practiced with any carry-out mechanism that is presently employed, in addition to the one illustrated or that will be put to practical use in the future. While the invention has been described in conjunction with the automatic gauge examination it is equally applicable to the transformation of read-out values in which reliability is required without maintenance for long periods of time. Also the invention is equally applicable to a variety of meters for measuring physical quantities including quantities of gas and water consumed.

I claim:

1. A displayed measurement translator device for providing coded measured values, said device comprising, in combination:

a digit wheel stepwise rotatable through incremental rotations of one tenth of one complete rotation thereof and having thereon 10 decimal digits, each of said digits corresponding to one of said incremental rotations of said digit wheel;

a disc-shaped encoding portion provided on said digit wheel, said encoding portion having four coupling openings circumferentially disposed thereon, said openings being divided into two groups each including two openings, said groups of openings being positioned such that the two openings of the first of said groups are located at selected two of 10 positions, corresponding to said 10 digits, circumferentially disposed at equal angular intervals on said encoding portion, and that the two openings of the second of said groups are located at two successive of said positions spaced away from the positions of said first group by one position;

five driving windings disposed adjacent one surface of said disc-shaped encoding portion at alternate ones of said 10 positions and continuously energized with an alternating current;

five output windings, each disposed in opposing relationship with one of said driving windings on that side of said encoding portion opposite from said driving windings; and the arrangement being such that at each position of incremental rotation of said digit wheel one only of said groups of openings is aligned with one of said opposed output and driving windings, and those output windings aligned with said two openings of said one group are electromagnetically coupled to the opposed driving windings through said two openings to provide a voltage signal representing that digit in the form of a two out of five code representative of said each position of incremental rotation of said digit wheel.

2. A displayed measurement translator device as claimed in claim 1, wherein each of said driving and output windings are inductively disposed on an individual magnetic core, and wherein said magnetic cores are disposed such that the magnetic cores for said driving windings face those for said opposed output windings through the respective of said coupling openings during the stepwise rotational movement of said disc-shaped encoding portion.

3. A displayed translator device as claimed in claim 2, further comprising one supporting means disposed on each side of said disc-shaped encoding portion, one of said supporting means supporting said magnetic cores for said driving windings and the other of said supporting means supporting said magnetic cores for said output windings.

* * * * *